H. W. Hewet  
Crank Paddle.

Nº 6,782.  Patented Oct. 9, 1849.

H. W. Hewet.
Crank Paddle.
Nº 6,782. Patented Oct. 9, 1849.

UNITED STATES PATENT OFFICE.

HENRY W. HEWET, OF NEW YORK, N. Y.

IMPROVEMENT IN RECIPROCATING PROPELLERS.

Specification forming part of Letters Patent No. 6,782, dated October 9, 1849.

*To all whom it may concern:*

Be it known that I, HENRY W. HEWET, of New York, in the county of New York and State of New York, have invented a new and useful Improvement in Propellers for Vessels; and I do hereby declare the following to be a full, clear, and exact description of the same, reference being had to the annexed drawings, making a part of this specification, in which—

Figure 1:
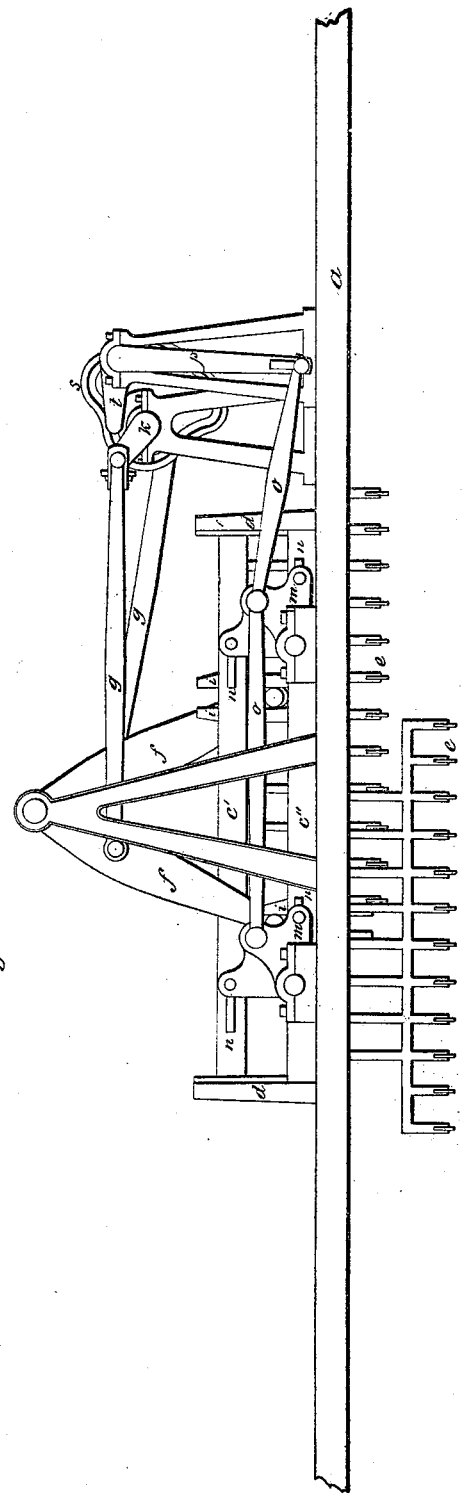
Figure 2:
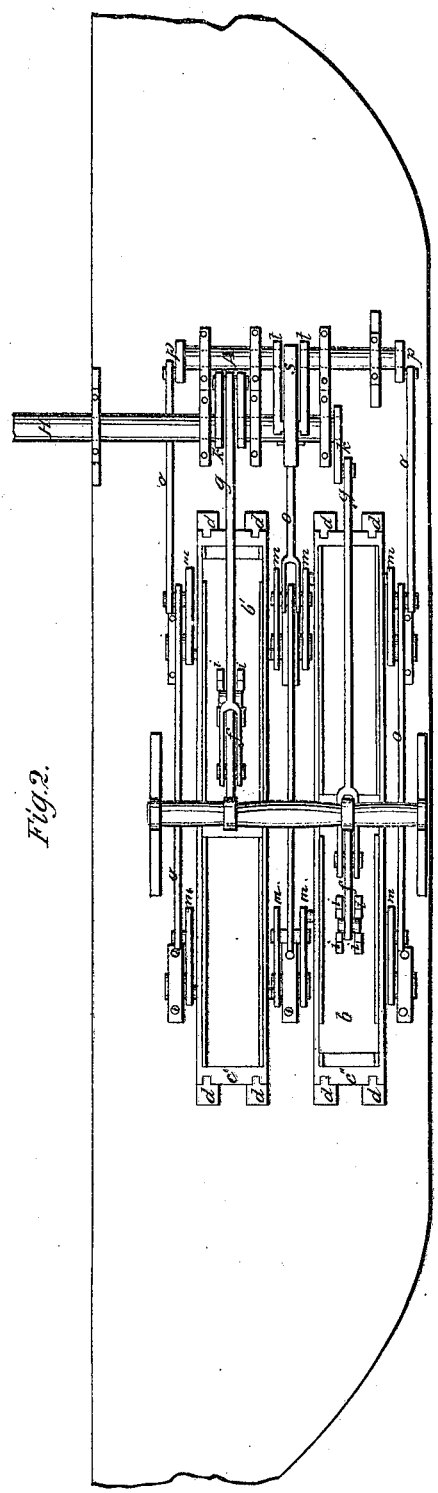
Figure 3:
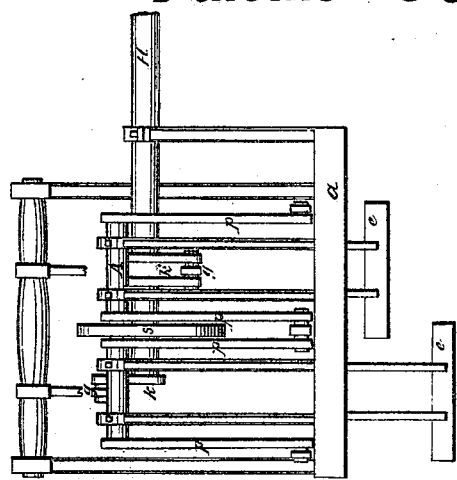
Figure 4:
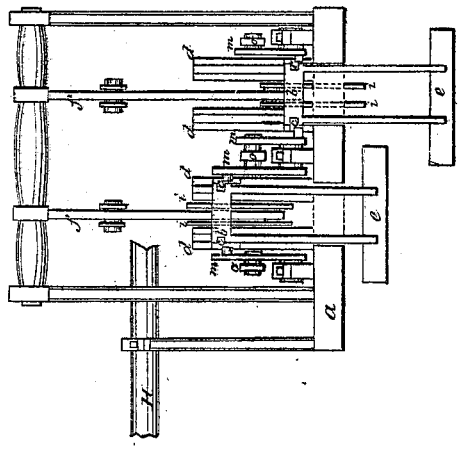

Figure 1 is a side elevation. Fig. 2 is a top view. Fig. 3 is an end elevation. Fig. 4 is an end elevation taken opposite to Fig. 3.

Similar letters refer to similar parts in all the figures, unless otherwise expressly noted.

The character of my invention consists in the construction of propellers for vessels, the main object sought being the conveyance of the propeller through the water, so as to avoid as far as possible angular action and render the motion parallel to that of the vessel. I am aware of several contrivances having already been invented having these objects in view, and mine, it will be seen, resembles one or two of them in several particulars. I propose, therefore, in order to make the parts which are new and different in my invention more apparent, to speak of several in this place.

In the paddle-wheel several attempts have been made to cause the buckets or floats to assume different positions in entering and leaving the water; but those, besides the want of strength, have failed also, from the fact that in seeking to obtain a better angle for entering and leaving the water have also very defective positions in the same according to the depth of immersion of the vessel. My invention does not, however, resemble this kind of propeller otherwise than that it attempts keeping the vertical action of the buckets or floats. My invention approaches more nearly another, which consists of a series of floats or buckets arranged along a bar or bars suspended by each end on cranks working on the guard of the vessel and so that these bars or rods may be lifted out of the water parallel to its surface, and be immersed in like manner, the floats being affixed to the bars, so that they will enter the water at right angles to its surface. In respect to the arrangement of the floats on the rods or bars just mentioned and my invention they are similar; but in the manner in which they enter and leave the water, as well as in passing through it, they are different and involve different principles of action. Now it will be seen that the floats on the horizontal bars must partake of the motion of the cranks on which they are suspended—that is, they describe an arc or curve in passing through the water whose radius is that of the cranks by which they are propelled. Therefore the speed with which they pass through the water varies from the line of immersion until they leave it because two motions are going on, one vertical and one horizontal, the horizontal motion increasing until the floats are at their greatest depth, and then diminishing as the vertical increases. Thus as the propeller can only act efficiently when at and near its lowest point of immersion it follows that the smaller the arc described while immersed the better; but as a vessel is subject to various positions in the water, being sometimes much deeper than others, this propeller will in the case of great immersion, afford at certain points an element of resistance rather than propulsion, and these will be at those points where the vertical motion is considerable and the horizontal relatively small.

There are besides other obstacles to the advantageous working, such as the large space passed through in revolution without producing any mechanical effect. In contradistinction to this working my propeller performs the following motions in each revolution: the whole series of buckets as they enter the water describe a curve in a contrary direction to the passage of the boat. This curvilinear motion terminates the moment the buckets are immersed in the water to the proper depths, from which point the motion is directly horizontal until they near the end of the stroke, when they rise from the water in a curve similar to the manner of entering. In order to make these effects understood, I now describe the mechanical arrangements and mode of operation.

At *a* is represented the usual guard commonly projecting over the sides of the boat, which must be sufficiently strong to sustain the machinery placed upon it. The drawings represent the guard as supporting the propellers, consisting of two series arranged side by side. These are attached to slides moving in guide-frames in such a manner that the frames perform the vertical motion, while the slides play horizontally, and of course at right angles to the motion of the frames.

$b$ and $b'$ represent the slides, while $c'$ $c''$ represent the frames. On each side of the frames guide-pieces project, as at $c$ $c$, Fig. 4, to support the slides and guide them in their horizontal motions. Each of these frames is affixed to and supported by vertical posts placed at the ends, as seen at the letter $d$. The ends of the frames are grooved and play upon guides on the posts, as clearly seen in the drawings. From the under sides of the slides $b$ a frame supporting the propellers or floats is firmly attached, the lower extremity of said frame terminating in the floats or buckets $e$. On the top of the slides an opening is made to admit of the insertion of the propelling-beams. On each side guides are inserted to keep hold of the beams during the oscillations. These are seen at $i$ $i$, &c.

The letters $f f$ show the propelling-beams. These are levers of the second class, having their fulcrums in a cross-beam suspended over the guard about midway between the stroke of the slides, as shown. These beams are connected directly to the driving-cranks by the links $g$.

H represents the main shaft, which extends into the hull of the boat, attached to and forms part of the driving-engine in the ordinary manner. It terminates on the guard in two cranks $k$ $k'$, placed in opposite directions and in line with each other, and these give motion to the beams $f$. This constitutes the moving parts for propelling the floats back and forth. We now come to describe those which raise them out of and immerse them in the water. This is effected by the action of the guide-frames $c'$ $c''$.

At $m$ is seen four right-angled cranks, two at each end of the frame. A pin from one end of each crank projects into a slot cut in the side of the frame, (seen at $n$, Fig. 1,) and at the other angle or point the cranks are connected to propelling-rods, which combine each pair of cranks on either side of the frame, as seen at $o$, the last link terminating at the end of a set of vibrating beams $p$, affixed to a cross-shaft A. To move this shaft A, and through it the guide-frames $c'$ $c''$, there is placed upon the main rotating shaft H at $s$ a cam. This cam has a groove cut on each face near its edge curved in such a manner as will produce the motion required in the beams $p$. This motion is imparted by means of two arms $t$, projecting from the shaft A, the end of said arms terminating in points which turn inward and play in the groove cut in the cam. This groove is cut so as to cause the point $t$ to play from and toward the center of H, and thus give vibration to $p$. It must be understood that the right-angled cranks $m$ are attached to the guide-frames $c'$ $c''$ in such a way that while one frame is elevated the other will be depressed, as seen in Fig 1, where $c'$ is up and $c''$ down.

The operation is as follows: Rotary motion being given to the shaft H puts the beams in vibration, causing them to play back and forth at each revolution, the slides $b$ being propelled along the guide-frames from end to end by their connection, as described. From this it will be seen that the floats $e$ must partake of the same motion, and thus the horizontal action necessary to propulsion is obtained. In Figs. 1, 3, and 4 the two sets of floats will be seen to have different elevations. Those lowest are in the proper position to take effect upon the water, while the highest, having traversed the extent of their stroke, are lifted out of the water and are returning to the place of starting. The cam now performs its office of raising and lowering the slides $b$, to which the floats are affixed. As the cam $s$ rotates on the shaft H it causes the arms $t$ $t$ to rise and fall, according to the curve in the side of the same. This vibrates the beam $p$, which, through the connections $o$ $o$, rocks the right-angled cranks $m$. The various movements are of course so timed as to cause these cranks to be shifted at or near the commencement of each stroke of the floats, or as the slides $b$ approach either end of the guide-frame. Thus in Fig. 1 it will be seen that the lowest row of paddles having nearly traversed to the end of the frame are about to be raised out of the water. The frame $c''$ is at the bottom of the guide-posts $d$, and the cam $s$ is just in the position to cause it to be raised. While being raised the floats are still being propelled onward, and thus rise out of the water in a curve, the direction of which is in the line of motion, because it would not do to lift the floats abruptly or vertically from the water, as that motion would produce a back action whether entering or leaving.

$c''$ shows the guide-frames in the proper position when the floats are immersed, and $c'$ their position when the floats are clear of the water and traversing forward to be again immersed, as before.

What I claim as of my own invention, and desire to secure by Letters Patent, is—

The combination of the sliding frames $b$ $b'$, to which the paddles are attached, with the horizontal guides $c$ $c'$ and vertical guides $d$ $d$, said paddles being actuated by motion derived from and mechanism connected with the engine-shaft, and the whole being constructed, arranged, and operating substantially as herein described, whereby a more extended horizontal motion of the floats, in comparison with the length of their vertical motion, is obtained.

H. W. HEWET.

Witnesses:
S. H. MAYNARD,
THOS. ATKINSON.